(12) United States Patent
Bree

(10) Patent No.: US 10,961,707 B2
(45) Date of Patent: Mar. 30, 2021

(54) BUILDING FORMED OF ENCAPSULATED STRUCTURAL FOAM PANELS

(71) Applicant: Charles Bree, Mercer (NZ)

(72) Inventor: Charles Bree, Mercer (NZ)

( * ) Notice: Subject to any disclaimer, the term of this patent is extended or adjusted under 35 U.S.C. 154(b) by 0 days.

(21) Appl. No.: 16/605,508

(22) PCT Filed: Apr. 20, 2018

(86) PCT No.: PCT/NZ2018/050055
§ 371 (c)(1),
(2) Date: Oct. 16, 2019

(87) PCT Pub. No.: WO2018/194465
PCT Pub. Date: Oct. 25, 2018

(65) Prior Publication Data
US 2020/0123758 A1    Apr. 23, 2020

(30) Foreign Application Priority Data

Apr. 20, 2017  (NZ) ........................................ 726867

(51) Int. Cl.
*E04C 2/20* (2006.01)
*E04B 1/343* (2006.01)
(52) U.S. Cl.
CPC .......... *E04C 2/205* (2013.01); *E04B 1/34321* (2013.01)
(58) Field of Classification Search
CPC .. E04C 2/205; E04B 1/34853; E04B 3/34846; E04B 1/3486
USPC .............................. 52/270, 284, 309.4, 309.9
See application file for complete search history.

(56) References Cited

U.S. PATENT DOCUMENTS

| | | | | |
|---|---|---|---|---|
| 2,691,291 A | * | 10/1954 | Henderson | .......... E04B 1/34823 52/79.9 |
| 3,093,935 A | * | 6/1963 | Dunn | ...................... E04D 3/351 52/309.8 |
| 3,331,173 A | * | 7/1967 | Elsner | ....................... E04C 2/38 52/309.11 |
| 3,650,872 A | * | 3/1972 | McKiernan | .............. A63B 6/00 156/304.3 |

(Continued)

FOREIGN PATENT DOCUMENTS

| | | | | |
|---|---|---|---|---|
| FR | 2389724 A1 | * | 12/1978 | ............... E04B 1/14 |
| GB | 1305969 A | * | 2/1973 | ............. E04C 2/205 |

(Continued)

OTHER PUBLICATIONS 2 page PDF, Polyurethane Article found at https://www.tudosobreplasticos.com/en/materiais/pu.asp, posted Oct. 2, 2014. (Year: 2014).*

(Continued)

*Primary Examiner* — Robert Canfield
(74) *Attorney, Agent, or Firm* — Mark M. Friedman

(57) ABSTRACT

The invention concerns a building having a wall comprising a plurality of structural wall panels, each panel having: a central core at least 80 mm thick formed from a substantially rigid polyurethane foam; and a polyurea or polyurethane skin 1-6 mm thick substantially encapsulating the central core; at least some of the panels incorporating a roof section; and the panels having sufficient 3 structural integrity to provide at least a wall of the building without the need for support beams.

14 Claims, 4 Drawing Sheets

(56) References Cited

U.S. PATENT DOCUMENTS

Figure 1:
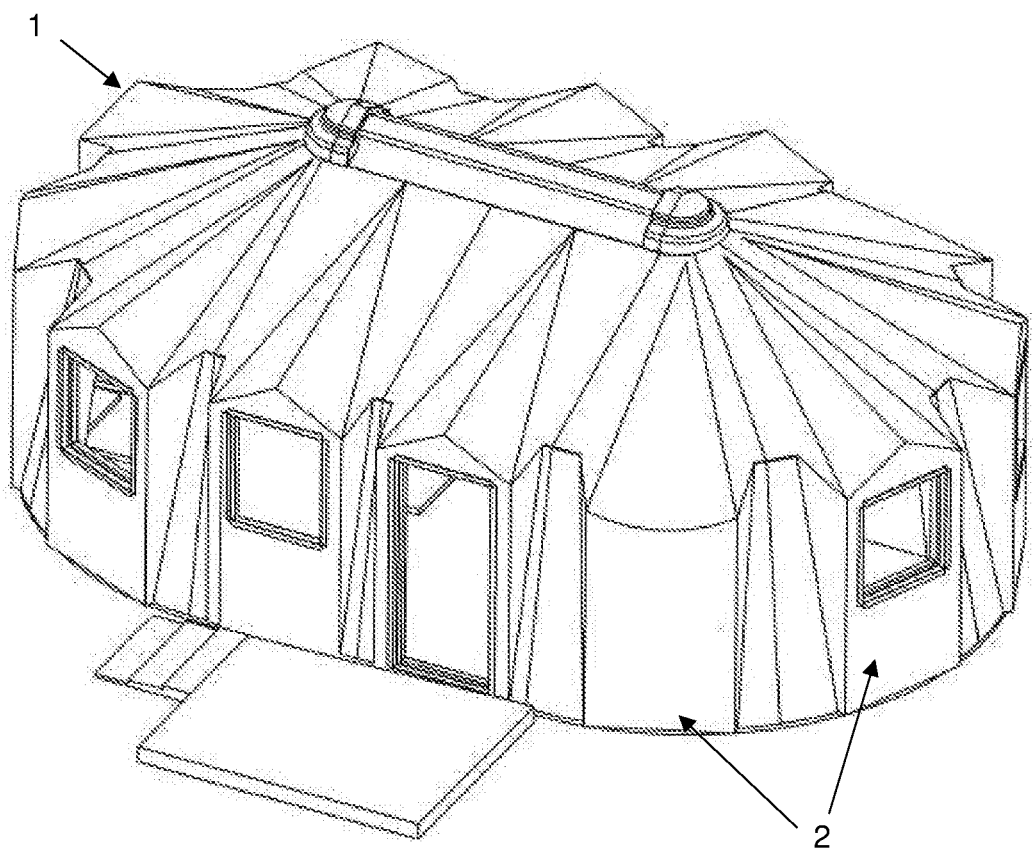

| | | | | |
|---|---|---|---|---|
| 3,729,875 | A * | 5/1973 | Felson | E04B 1/3412 52/79.7 |
| 3,778,528 | A | 12/1973 | Heifetz et al. | |
| 3,828,496 | A * | 8/1974 | Testaguzza | E04B 1/20 52/91.2 |
| 3,898,115 | A | 8/1975 | Watkins et al. | |
| 3,905,167 | A | 9/1975 | Watkins et al. | |
| 4,136,497 | A * | 1/1979 | Porter | E04C 2/205 52/483.1 |
| 4,187,651 | A * | 2/1980 | Tolsma | E04C 3/46 52/79.1 |
| 4,455,793 | A * | 6/1984 | Nania | E04B 1/04 52/309.12 |
| 4,984,406 | A * | 1/1991 | Friesen | E04B 1/12 52/284 |
| 5,810,956 | A * | 9/1998 | Tanis | B01F 5/0602 156/71 |
| 5,921,043 | A | 7/1999 | McDonald | |
| 6,035,583 | A * | 3/2000 | Papke | E04B 1/12 52/268 |
| 8,635,825 | B2 * | 1/2014 | Bacon | E04D 1/12 156/304.3 |
| 2002/0189185 | A1* | 12/2002 | Hunter, Jr. | E04C 2/246 52/408 |
| 2003/0029108 | A1* | 2/2003 | Neuhaus, III | E04B 1/161 52/309.12 |
| 2003/0033769 | A1* | 2/2003 | Record | E04B 1/14 52/270 |
| 2004/0107652 | A1* | 6/2004 | Elliott | E02D 27/01 52/79.1 |
| 2004/0134588 | A1 | 7/2004 | Gerken et al. | |
| 2006/0096213 | A1* | 5/2006 | Griffin | E04D 3/355 52/409 |
| 2007/0011967 | A1* | 1/2007 | Frazer | E04C 2/296 52/309.4 |
| 2007/0256379 | A1* | 11/2007 | Edwards | B32B 21/047 52/309.9 |
| 2008/0047217 | A1* | 2/2008 | Browning | E04B 1/34321 52/588.1 |
| 2009/0165412 | A1* | 7/2009 | Flynn | E04D 3/358 52/309.3 |
| 2010/0151225 | A1* | 6/2010 | Mabey | C08J 9/0066 428/304.4 |
| 2010/0269420 | A1* | 10/2010 | Zaidi | E04H 1/005 52/79.7 |
| 2010/0325971 | A1* | 12/2010 | Leahy | E04H 1/005 52/79.1 |

FOREIGN PATENT DOCUMENTS

| | | | | |
|---|---|---|---|---|
| GB | | 1340250 A | 12/1973 | |
| WO | WO-2006070280 A1 * | | 7/2006 | E04F 13/10 |
| WO | WO-2010036130 A1 * | | 4/2010 | E04B 1/3211 |

OTHER PUBLICATIONS 20 page PDF of paper titled Polyurea Elastomer Technology: History, Chemistry & Basic Formulating Techniques, 2004. (Year: 2004).*

International Search Report of PCT/NZ2018/050055, dated Jun. 13, 2018.

* cited by examiner

BUILDING FORMED OF ENCAPSULATED STRUCTURAL FOAM PANELS

FIELD OF THE INVENTION

A preferred form of the invention relates to a building formed from structural wall panels having a core encapsulated by a skin.

BACKGROUND

It is known to use panels for buildings, having a central insulating layer sandwiched between two outer layers, all supported by wall beams or the like. The outer layers may be of sheet metal, wood, cement or any other suitable material. The inner layer may be polystyrene. Such panels tend to be heavy and require a crane to lift into place. Sometimes such the panels undesirably delaminate, or in other words the outer layer separates from the inner layer. In panels with a core of polystyrene, delamination tends to occur from the edges. The outer layer pulls away from the core, sometimes drawing polystyrene with it, causing damage.

It is an object of a preferred form of the invention to go at least some way towards addressing one or more of the above problems. However, it should be appreciated that the invention has more general application, and so any objects or advantages applicable to the preferred embodiment should not be seen as a limitation on the scope of claims expressed more broadly. The object of the invention per se is simply to provide the public with a useful choice.

SUMMARY OF INVENTION

According to one aspect of the invention there is provided a A building having a wall comprising a plurality of structural wall panels, each panel having:
a central core at least 80 mm thick formed from a substantially rigid polyurethane foam; and
a polyurea or polyurethane skin 1-6 mm thick substantially encapsulating the central core;
at least some of the panels incorporating a roof section; and
the panels having sufficient structural integrity to provide at least a wall of the building without the need for support beams.

Optionally the central core is at least 100 mm thick.
A building, wherein the roof section has:
a central core formed from a substantially rigid polyurethane foam, and
a polyurea or polyurethane skin substantially encapsulating the central core.

Optionally at least one panel includes a window opening or frame, or part of a window opening or frame.
Optionally at least one panel includes a doorway or part of a doorway.
Optionally the panels are connected directly to one another.
Optionally the connections are spray sealed.
Optionally at least one panel includes a joining flap and a neighbouring panel has a recess that receives the flap.
Optionally the panels are glued to one another.
Optionally at least one panel includes tie down straps.
Optionally the skin has been sprayed onto the core.
Optionally the wall panels are connected to a floor by spraying a coating onto the bottom of each panel and the floor.

Preferably the core has been formed in a mould to have a density of 30-45 kg/m$^3$;
a) the skin has been sprayed onto the core;
b) a least some panels have a joining flap secured to a recess in an adjoining panel; and
c) each panel is tied to a foundation or floor by spraying polyurea or polyurethane between the panel and foundation or floor.

Optionally the joining flap comprises polyurethane or polyurea.
Optionally the joining flap comprises polyurea.

DRAWINGS

Figure 2:
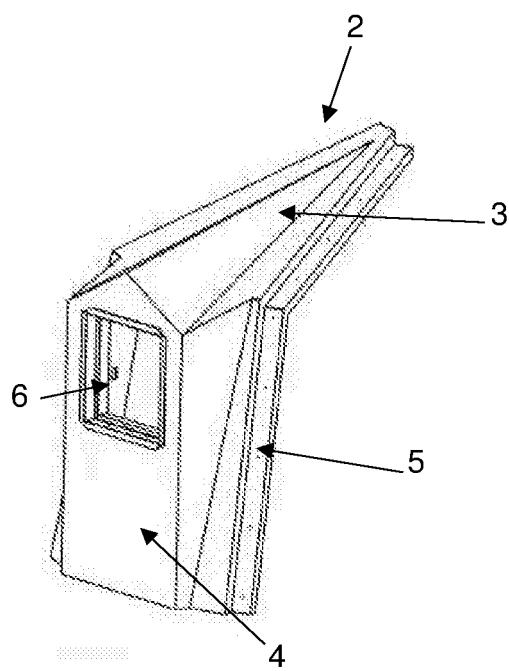
Figure 3:
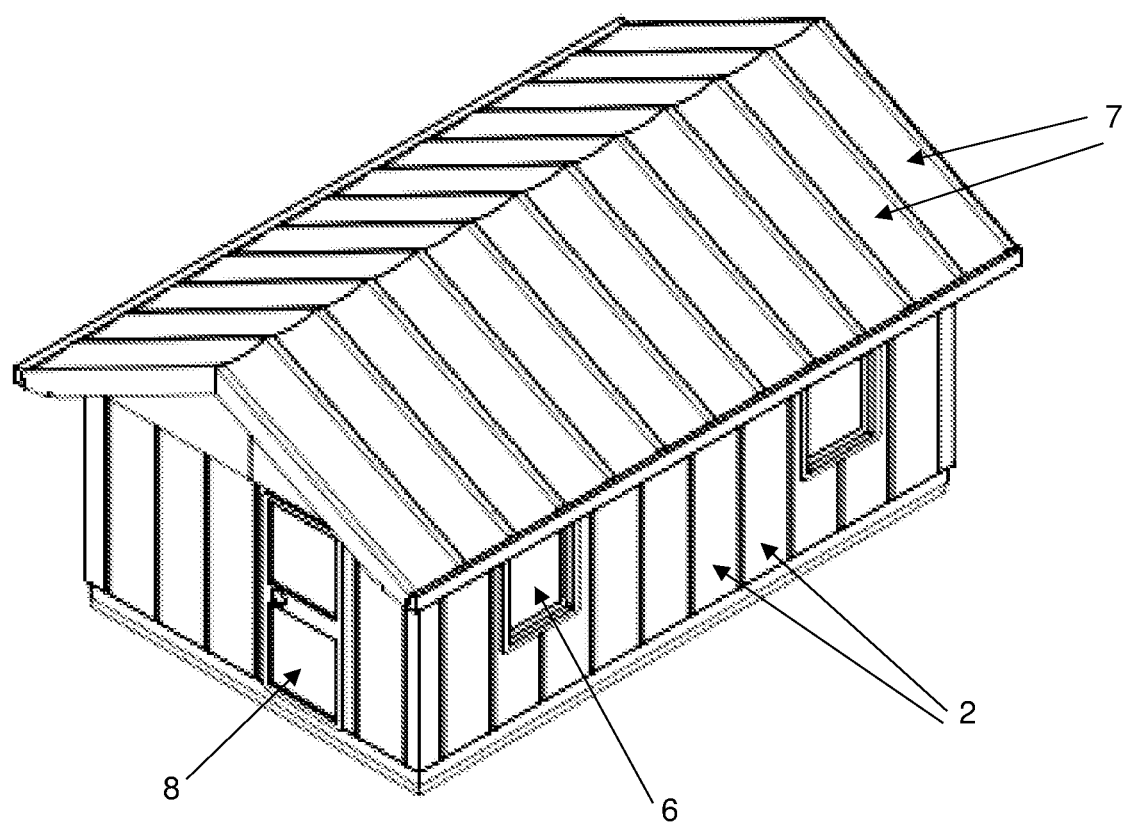
Figure 4A:
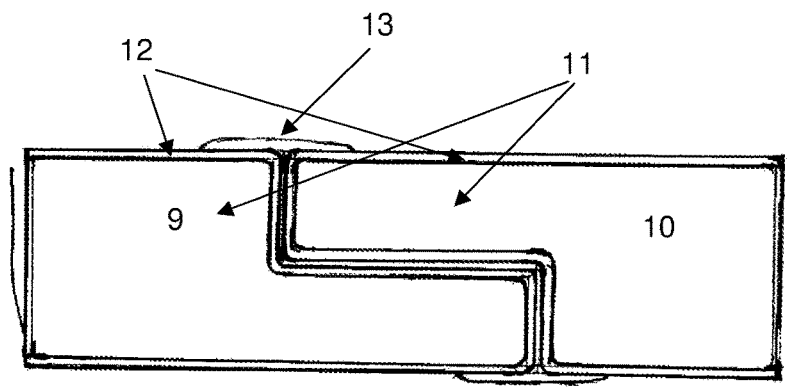
Figure 4B:
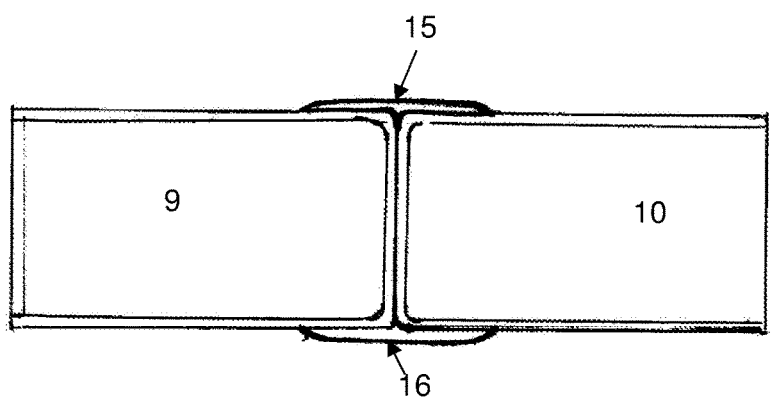
Figure 4C:
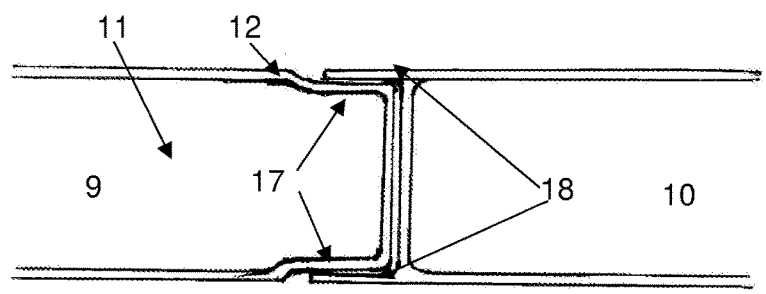
Figure 6:
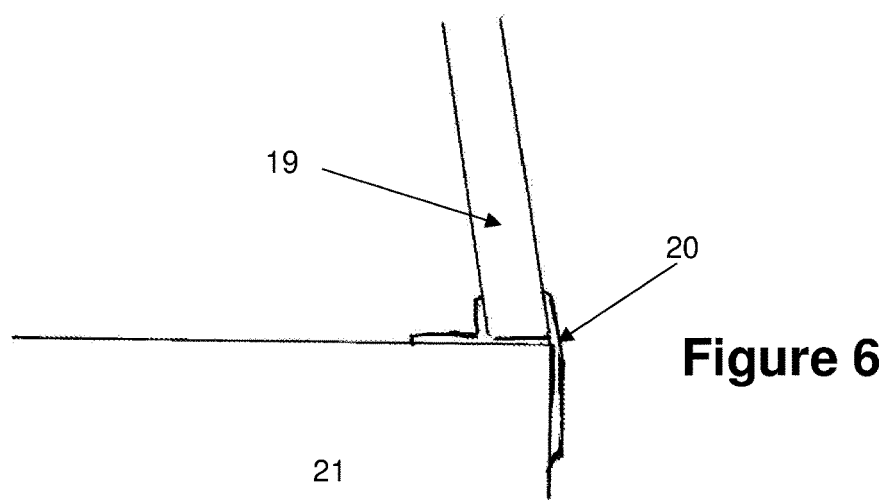
Figure 5A:
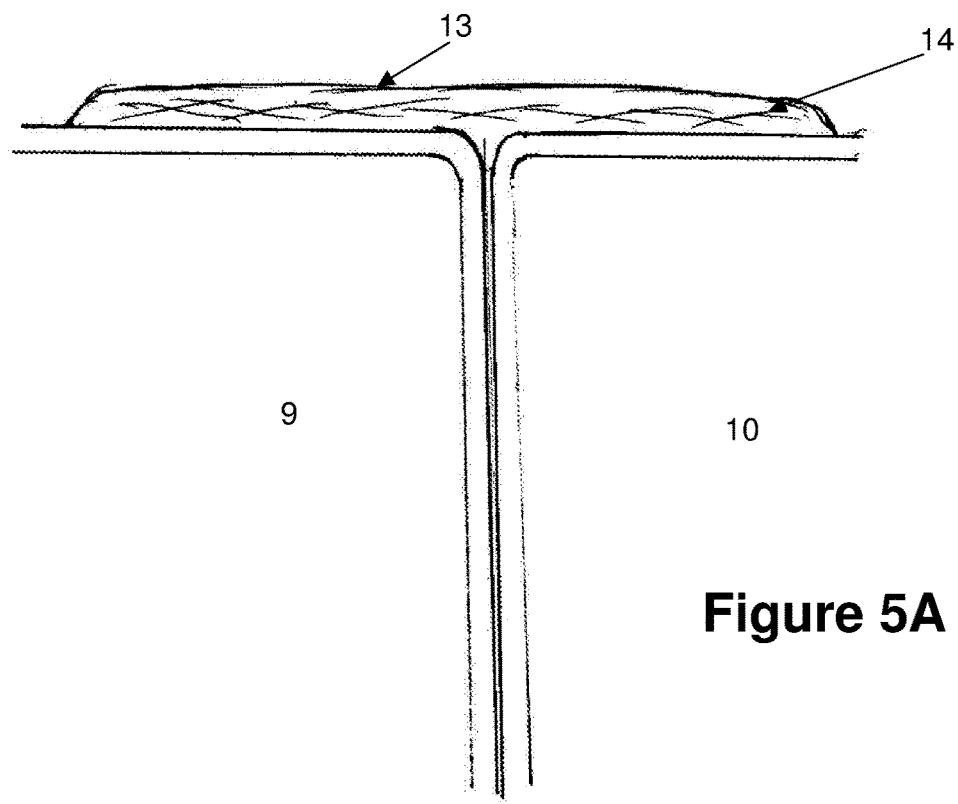
Figure 5B:
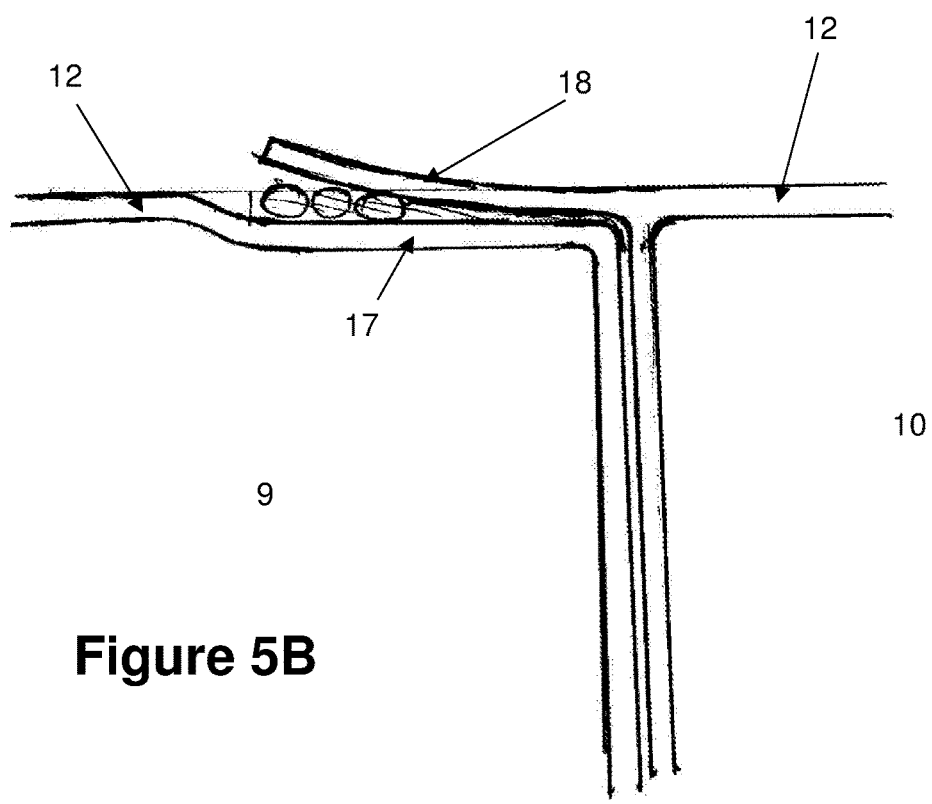

Some preferred embodiments of the invention will now be described by way of example and with reference to the accompanying drawings, of which:
FIG. 1 is an isometric view of a building formed from a series of panels;
FIG. 2 is an isometric view of one of the panels;
FIG. 3 is an isometric view of a further building formed from a series of panels;
FIG. 4A is a side elevation showing one way of connecting wall panels;
FIG. 4B is a side elevation showing an alternative way of connecting panels;
FIG. 4C is a side elevation showing a further alternative way of connecting panels;
FIG. 5A is a side elevation showing a further alternative way of connecting panels;
FIG. 5B is a side elevation showing a further alternative way of connecting panels; and
FIG. 6 is a side elevation illustrating the manner of connecting a wall panel with a floor.

DETAILED DESCRIPTION

Referring to FIG. 1, a building 1 is formed from a number of structural panels 2 that are connected to one another. FIG. 2 shows one type of structural panel 2 that can be used in creating the building 1. The panel 2 has a roof section 3, a wall section 4, a connecting part 5 and a window opening 6. It has a number of wall and roof section ridges for added strength. Other types of structural panel that can be used in creating the building include wall and roof panels with no window, and wall and roof panels with a door, wall only panels, and roof only panels. In each case the panels may have a flat outer surface or a curved outer surface. In FIG. 1, panels with curved outer walls form the ends of the building, and the panels with the flat outer walls form the sides of the building. It is possible to form the building in different configurations. The shape of the panel in FIG. 2 facilitates significant structural strength.

In each case panels include connecting parts that allow one panel to be fitted to another. FIGS. 4A to 5B illustrate different ways that panels may be fitted together. As is evident from the drawings, the edges of these panels have a different shape.

The panels are made by first providing a mould shaped to correspond with the desired panel shape. The mould is coated with a release agent, for example gel, is then closed and polyurethane foam is introduced to it. The foam expands to fill the mould to provide the central core of the panel. The foam gives both structural strength and insulation properties to the panel. Preferably the foam is a formula cellular plastic foam with a density between 30 and 45 kg/m$^3$, and most preferably between 35 and 40 kg/m$^3$.

The thickness of the foam will determine the amount of insulation provided by the panel. Panels created for buildings for use in colder climates may be thicker than those created for warmer climates. To provide suitable strength the foam is at least 80 mm thick. In preferred embodiments, the foam is at least 100 mm thick. By using polyurethane foam, an R-value of about 1.2 can be obtained for a 25 mm thick panel. This means that for a 125 mm thick panel the R-value is about five times that amount, or in other words about '6'. The R-values mentioned in this specification are in SI units.

Because the panel is formed using a mould, the panel will take the shape of the mould. This means that the panels are not limited to planar shapes. The panels shown in FIGS. 1 and 2, for example, are not planar. Non-planar panels may have additional strength provided by the shape of the panel.

The panel 2 also has a skin of a polyurea or polyurethane. The skin can be applied either to the mould, ie before the foam is introduced to the mould, or after the foam has been cured and removed from the mould. Preferably the skin is an elastomeric membrane.

In one embodiment, the polyurea skin may be Demilec Maxguard U190. This product is fire resistant, has very good adhesion, is rubbery (not hard) and has high tensile strength (between about 8.3-9.7 Mpa). It also has a Shore A hardness of between about 90 and 95, and high tear resistance. Other polyureas or polyurethanes with similar characteristics could also be used.

In another embodiment, the polyurethane skin is Demilec Maxguard P-855. This product has high tensile strength (between 15.9 and 20 Mpa), a Shore D hardness of 55-65 and high tear resistance.

In one embodiment, the skin is applied to the mould before the foam is introduced to the mould. In this embodiment the mould may be sprayed first with a mould release agent.

The mould is then sprayed with the polyurea or polyurethane that will form the skin. The mould is then closed and the foam introduced to the mould to form the panel. The panel is removed from the mould when cured.

In another embodiment, a panel core is produced by introducing polyurethane foam to a closed mould corresponding to a panel shape. In this instance the skin has not been sprayed into the mould before the foam is introduced. Rather, after the core is removed from the mould it is sprayed with polyurea or polyurethane to form a skin on the exterior surfaces of the core. Preferably the skin is sprayed over all surfaces. Optionally the polyurea used to spray on the skin is tinted and in this way panels of different colours can be readily produced. The completed panel can also be painted if desired.

Once completed the panels 2 can be assembled to form the building 1 without the need for any additional framing or support structure. The panels have sufficient structural integrity to provide at least a wall of a building without the need for support beams along the length of the building. The panels are therefore self-supporting, requiring no framing or beam-type bracing, etc. In some embodiments, the panels can be formed with conduits within the foam for electrical wiring, etc. The building can be a residential, commercial or for some other use.

The polyurea or polyurethane skin is such that it gives the panel 2 significant extra strength. The skin at the edges of the panel in a sense times the major surfaces together. The polyurea or polyurethane skin should be at least 0.5 mm thick. In preferred embodiments, the skin is from 0.5 mm to 10 mm thick. Most preferably, the skin is from 1 mm to 6 mm thick. The strength of the panel increases as the thickness of the skin increases. The skin thickness may differ depending on the intended end use of the panel. For example, roof panels may have a thinner skin than wall panels, and floor panels may have a thicker skin than wall panels. If the skin is applied by coating the panel after the foam core has been moulded, then it is possible to more easily vary its thickness so that different part of the panel have different skin thickness. The panel may also be moulded to include window or door openings or frame structures for receiving a window or door respectively.

Coating the core completely in a polyurea or polyurethane elastomer means that there are no edges where the core is exposed. This means that the skin will not likely delaminate. And again, the entire outer surface of the panel is tied together through its perimeter edges. Because the skin covers the edges around every joint, the edges are protected during transport. Using a foam core with a polyurea or polyurethane skin provides a relatively lightweight panel.

FIG. 3 exemplifies another building that may be created using the same sort of panels, but with a different shape. The building has wall panels 2 and roof panels 7. Some of the wall panels may have openings to allow a window 6 to be installed. A door 8 may also be installed. If needed, smaller panels can be formed to fit above the door or around a window frame, etc. In the building shown in FIG. 3 the roof has a series of concave grooves running down the roof to promote efficient draining of water. A roof panel 7 may include one or more such grooves. The grooves also provide strength to the panel.

Although not shown, the same system may be used to provide floor panels for a building. Alternatively, the building can be built on a different style of foundation.

FIGS. 4A, 4B and 4C show different ways in which two panels can be connected.

FIG. 4A shows panels 9 and 10 with complementary stepped ends. They have a central core 11 and a skin 12. These figures are illustrative only; they are not drawn to scale. After adjacent panel ends are fitted together they may be sprayed with polyurea 13 to fill the joint between them.

FIG. 4B shows an alternative way of fitting panels 9 and 10. They are butted together and the joint is sprayed on both sides 12 and 13 with polyurea to hold the panels together. FIG. 5A shows one corner of each of panels 9 and 10. When butted together a sealing layer 13 can be sprayed over the joint between the panels. The sealing layer 13 may also include fibre 14 to improve the strength of the joint.

FIG. 4C shows a further way of fitting two panels 9 and 10 together. The end part of panel 9 has an area of less width 17 than the rest of the panel. This is because the foam core is narrower in that region, not the skin 12. The panel 10 is formed with integral flap like extensions 18 of the skin 12 at one end, arranged to fit over the smaller width 17 of the panel 9. In other embodiments the flap may be separate to the rest of the panel and glued into panel recesses on each side of a joint, or sit proud on one side and into a recess on the other. The flap 18 is preferably flexible in each case. FIG. 5B shows how the panels may be glued together. In this regard flap 18 may be glued to end 17 using any suitable adhesive, for polyurethane glue. In some embodiments, the flaps may be formed from stainless steel tie down straps that are attached to the rest of the panel by the polyurea skin.

FIGS. 4A to 4C and 5A to 5C are illustrate embodiments where no screws or nails are needed to connect two panels. The panels are joined by aligning their ends or complementary joints and spraying polyurea or polyurethane over these. Alternatively, one end of the panel may include flaps that are glued over the adjoining panel. In other embodiments, the panels may be connected with other fixings. It should be noted that the panels in FIGS. 4A to 4C may extend lengthwise further than shown; they are not drawn to scale.

FIG. 6 illustrates one way of connecting a wall panel 19 to a foundation or floor 21. The panel is first positioned on the floor and then polyurea 20 is sprayed at the base of the panel to attach it to the floor. Preferably, the polyurea sits between the panel and the floor and extends a little way up each side of the panel, as well as over the inside of the floor and over the outer side of the floor. This ties the panel to the floor. Preferably the polyurea joint is waterproof.

The joints described above formed from polyurea or polyurethane have good shock resistance and some flexibility. This means that a building formed from the panels may perform well in an earthquake, maintaining strong and waterproof panel joints. The joints also have good wind resistance. However, should the joints fail they can be easily repaired by respraying with polyurea or polyurethane. The panels are able to flex a small amount, but not so much that their strength is compromised.

While some preferred embodiments have been described by way of example it should be appreciated that modifications and improvements can be made without departing from the scope of the following claims.

The invention claimed is:

1. A building having a wall comprising a plurality of structural wall panels, each structural wall panel comprising:
   a central core at least 80 mm thick formed from a polyurethane foam; and
   a polyurea or polyurethane skin approximately 1-6 mm thick encapsulating the central core, the encapsulation completely covering the central core to prevent delamination;
   at least some of the panels incorporating a roof section; and
   the panels having sufficient structural integrity to provide at least a wall of the building without the need for support beams.

2. A building according to claim 1, wherein the central core is at least 100 mm thick.

3. A building according to claim 1, wherein the roof section comprises:
   a central core formed from a polyurethane foam, and
   a polyurea or polyurethane skin substantially encapsulating the central core.

4. A building according to claim 1, wherein at least one panel includes at least one of: a window opening a frame, and/or, part of a window opening or frame.

5. A building according to claim 1, wherein at least one panel includes a doorway or part of a doorway.

6. A building according to claim 1, wherein the panels are connected directly to one another at locations defining connections.

7. A building as claimed in claim 6, wherein the connections are spray sealed.

8. A building as claimed in claim 6, wherein at least one panel includes a joining flap and a neighbouring panel has a recess that receives the flap.

9. A building as claimed in claim 6, wherein the panels are glued to one another.

10. A building according to claim 1, wherein the skin has been sprayed onto the core.

11. A building according to claim 1, wherein, the panels defining wall panels are connected to a floor by spraying a coating onto the bottom of each panel and the floor.

12. A building according to claim 1, wherein: a) the core has been formed in a mould to have a density of 30-45 kg/m3; b) the skin has been sprayed onto the core; c) a least some panels have a joining flap secured to a recess in an adjoining panel; and d) each panel is tied to a foundation or floor by spraying polyurea or polyurethane between the panel and foundation or floor.

13. A building according to claim 8 wherein the joining flap comprises polyurethane or polyurea.

14. A building according to claim 8 wherein the joining flap comprises polyurea.

* * * * *